US 9,166,865 B2

(12) United States Patent
Garza et al.

(10) Patent No.: US 9,166,865 B2
(45) Date of Patent: Oct. 20, 2015

(54) MOBILITY OPERATION RESOURCE ALLOCATION

(71) Applicant: International Business Machines Corporation, Armonk, NY (US)

(72) Inventors: Maria Garza, Round Rock, TX (US); Neal R. Marion, Georgetown, TX (US); Nathaniel S. Tomsic, Austin, TX (US); Vasu Vallabhaneni, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 100 days.

(21) Appl. No.: 13/671,422

(22) Filed: Nov. 7, 2012

(65) Prior Publication Data
US 2014/0129958 A1   May 8, 2014

(51) Int. Cl.
| G06F 3/048 | (2013.01) |
| H04L 29/08 | (2006.01) |
| G06F 9/00 | (2006.01) |
| G06F 17/30 | (2006.01) |
| G06F 9/48 | (2006.01) |

(52) U.S. Cl.
CPC .......... *H04L 29/08144* (2013.01); *G06F 3/048* (2013.01); *G06F 9/00* (2013.01); *G06F 9/4856* (2013.01); *G06F 17/30* (2013.01)

(58) Field of Classification Search
None
See application file for complete search history.

(56) References Cited

U.S. PATENT DOCUMENTS

| 6,105,053 A * | 8/2000 | Kimmel et al. ............... 718/105 |
| 6,226,734 B1 * | 5/2001 | Kleinsorge et al. ............. 712/13 |
| 6,538,669 B1 * | 3/2003 | Lagueux et al. ............. 715/764 |
| 7,181,744 B2 * | 2/2007 | Shultz et al. .................. 718/104 |
| 7,814,491 B1 * | 10/2010 | Chen et al. .................... 718/104 |
| 8,402,000 B2 * | 3/2013 | Gokhale et al. ............... 707/674 |
| 8,429,630 B2 * | 4/2013 | Nickolov et al. .............. 717/148 |
| 8,613,085 B2 * | 12/2013 | Diab et al. ...................... 726/22 |
| 8,615,579 B1 * | 12/2013 | Vincent et al. ................ 709/224 |

(Continued)

FOREIGN PATENT DOCUMENTS

WO   WO 2013002777 A1 *  1/2013

OTHER PUBLICATIONS

Christopher Clark, Keir Fraser, Steven Hand, Jacob Gorm Hansen, Eric Jul, Chistian Limpack, Ian Pratt, and Andrew Warfield; Live Migration of Virtual Machines; 2005, NSDI '05: 2nd Symposium on Networked Systems Design & Implementation, USENIX Association, pp. 273-286.*
Michael A. Kozuch, Michael Kaminsky, Michael P. Ryan; Migration without Virtualization; 2009, Proceeding of the 12th conference on Hot topics in operating systems; USENIX Association, Berkeley, CA.*

(Continued)

*Primary Examiner* — Matt Kim
*Assistant Examiner* — Maryam Ipakchi
(74) *Attorney, Agent, or Firm* — James L. Baudino

(57) ABSTRACT

According to one aspect of the present disclosure a system and technique for mobility operation resource allocation is disclosed. The system includes a first machine having a running application, and a management console operable to manage migrating the running application from the first machine to a second machine. The management console is operable to: display an interface indicating a plurality of selectable mobility settings, each mobility setting corresponding to a desired resource allocation to utilize for the migration; receive via the interface, a selection of a mobility setting to apply for migrating the running application; and initiate migration of the running application from the first machine to the second machine utilizing resources as set by the selected mobility setting.

19 Claims, 5 Drawing Sheets

(56) References Cited

U.S. PATENT DOCUMENTS

| | | | |
|---|---|---|---|
| 8,875,160 B2* | 10/2014 | Hunt et al. | 719/319 |
| 2004/0083481 A1* | 4/2004 | Shultz et al. | 719/312 |
| 2005/0060722 A1* | 3/2005 | Rochette et al. | 719/319 |
| 2006/0259606 A1* | 11/2006 | Rogers et al. | 709/223 |
| 2007/0250838 A1* | 10/2007 | Belady et al. | 718/105 |
| 2009/0132804 A1* | 5/2009 | Paul et al. | 713/150 |
| 2010/0205602 A1* | 8/2010 | Zedlewski et al. | 718/1 |
| 2010/0318608 A1* | 12/2010 | Huang et al. | 709/205 |
| 2011/0040725 A1* | 2/2011 | Sugimoto | 707/609 |
| 2011/0064014 A1 | 3/2011 | Li et al. | |
| 2011/0081914 A1 | 4/2011 | Lin et al. | |
| 2011/0283017 A1 | 11/2011 | Alkhatib et al. | |
| 2012/0042034 A1* | 2/2012 | Goggin et al. | 709/216 |
| 2012/0072913 A1* | 3/2012 | Uola et al. | 718/100 |
| 2012/0216135 A1* | 8/2012 | Wong et al. | 715/764 |
| 2013/0054734 A1* | 2/2013 | Bond et al. | 709/217 |
| 2014/0137125 A1* | 5/2014 | Hsu | 718/102 |

OTHER PUBLICATIONS

Chahal, et al. "Testing Live Migration with Intel Virtualization Technology FlexMigration", retrieved at: https://communities.intel.com/docs/DOC-2538, White Paper, Jan. 2009, pp. 1-12.*

Wu, Yangyang, et al.; "Performance Modeling of Virtual Machine Live Migration"; Proceedings of the 2011 IEEE 4th Intern'l Conference on Cloud Computing (CLOUD 2011); pp. 492-499; IEEE Computer Society; 2011.

Bailey, John E., et al.; "IBM Power VM Live Partition Mobility"; IBM Corporation, ibm.com/redbooks/sg247460; Mar. 2009.

IBM; "A Method to Enable Adapter Resource Management in a Logical Partitioning Environment"; http://www.ip.com/pubview/IPCOM000146957D; Feb. 28, 2007.

IBM; "Cooperative scheduling between logical partitions on the same physical machine"; http://www.ip.com/pubview/IPCOM000157031D; Aug. 10, 2007.

* cited by examiner

MOBILITY OPERATION RESOURCE ALLOCATION

BACKGROUND

In some data processing environments, an application and/or workload may be migrated from one computing environment to another computing environment. For example, system virtualization is a technology which can divide a single host (e.g., computer, server, etc.), into multiple parts, or partitions, each running a separate instance, or image, of an operating system. The instances of the operating systems or partitions are separate, or isolated, from each other in some ways. For example, the partitions have separate file systems, separate users, separate applications, and separate processes. However, the partitions may also share some resources of the host. For example, the partitions can share the memory, the kernel, the processors, the hard drives, and/or other software, firmware, and/or hardware of the host. Thus, each partition or instance of the operating system can look and feel like a separate server or machine from the perspective of its users. These instances are commonly referred to as "virtual" or "virtualized" machines, and each partition may be referred to as a logical partition (LPAR).

One server or data processing can generally host a number of LPARs. These LPARs may also be transferred or migrated from one server or system to another. For example, to facilitate hardware updates or other types of maintenance services, an LPAR may be migrated from one server to another without disrupting the running of an operating system and hosted applications of the migrating LPAR, thereby maintaining service operability without disruption.

BRIEF SUMMARY

According to one aspect of the present disclosure a system and technique for mobility operation resource allocation is disclosed. The system includes a first machine having a running application, and a management console operable to manage migrating the running application from the first machine to a second machine. The management console is operable to: display an interface indicating a plurality of selectable mobility settings, each mobility setting corresponding to a desired resource allocation to utilize for the migration; receive via the interface, a selection of a mobility setting to apply for migrating the running application; and initiate migration of the running application from the first machine to the second machine utilizing resources as set by the selected mobility setting.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Figure 1:
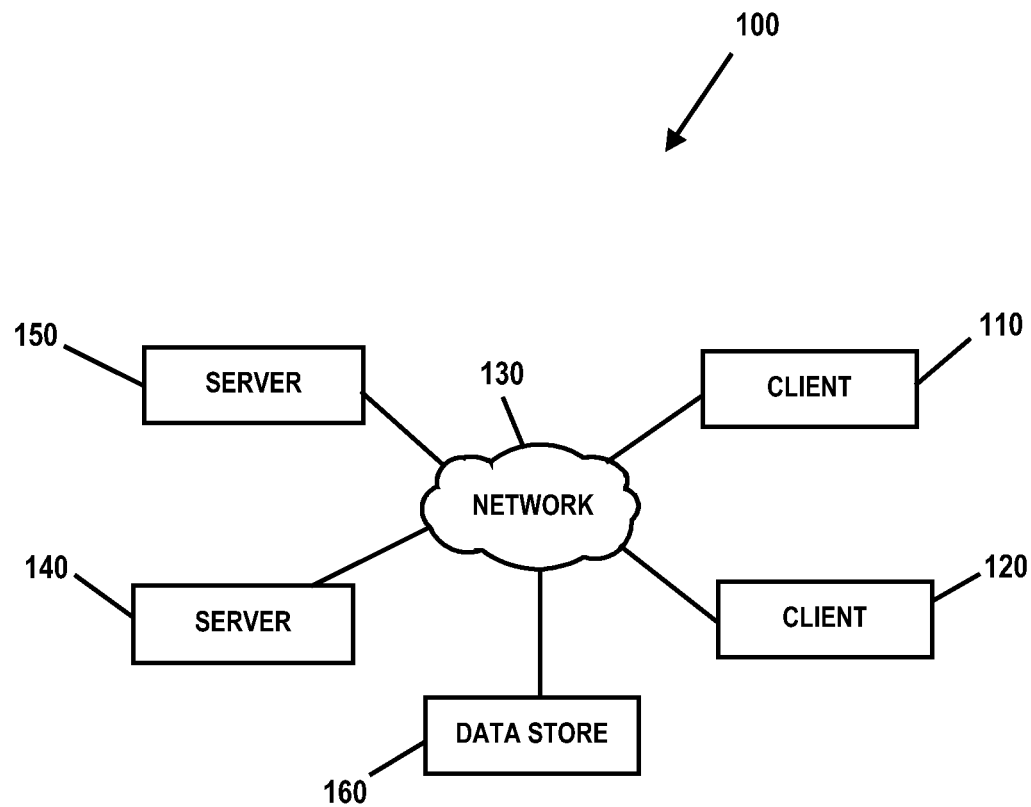
FIG. 1 is an embodiment of a network of data processing systems in which the illustrative embodiments of the present disclosure may be implemented.

Embodiments of the present disclosure provide a method, system and computer program product for mobility operation resource allocation. For example, in some embodiments, the method and technique includes: receiving a request to migrate a running application from a first machine to a second machine; displaying an adjustable resource allocation mobility setting interface indicating a plurality of mobility settings comprising at least one performance-based mobility setting and at least one concurrency-based mobility setting; receiving, via the interface, a selection of a mobility setting defining a resource allocation to utilize for the migration; and migrating the running application from the first machine to the second machine utilizing resources as set by the selected mobility setting. Embodiments of the present disclosure enable the flexible selection of resources to utilize for application migration based on performance and/or concurrency requirements. Embodiments of the present disclosure utilize an interface that enables a user/administrator to select performance-based and/or concurrency-based settings to utilize for application migration, thereby accommodating rapid movement of larger partitions when performance is critical and/or migrating a greater quantity of less active partitions concurrently if performance is not critical. Embodiments of the present disclosure enable a user/administrator to apply the mobility setting(s) on a partition-by-partition basis as well as prioritize the migration of certain partitions.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer usable or computer readable medium(s) may be utilized. The computer readable medium may be a computer readable signal medium or a computer readable storage medium. A computer readable storage medium may be, for example but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
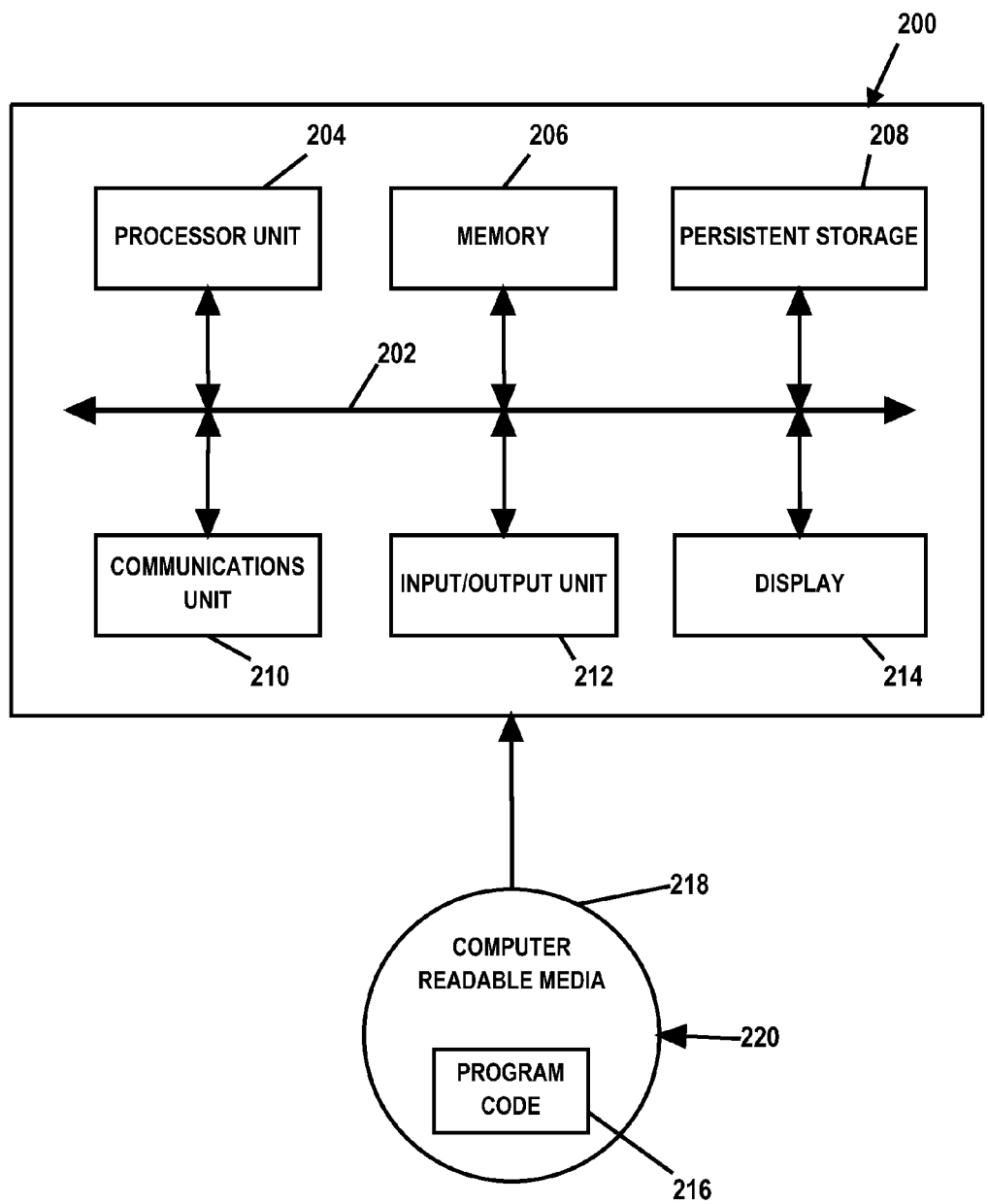
FIG. 2 is an embodiment of a data processing system in which the illustrative embodiments of the present disclosure may be implemented.

With reference now to the Figures and in particular with reference to FIGS. 1-2, exemplary diagrams of data processing environments are provided in which illustrative embodiments of the present disclosure may be implemented. It should be appreciated that FIGS. 1-2 are only exemplary and are not intended to assert or imply any limitation with regard to the environments in which different embodiments may be implemented. Many modifications to the depicted environments may be made.

FIG. 1 is a pictorial representation of a network of data processing systems in which illustrative embodiments of the present disclosure may be implemented. Network data processing system 100 is a network of computers in which the illustrative embodiments of the present disclosure may be implemented. Network data processing system 100 contains network 130, which is the medium used to provide communications links between various devices and computers connected together within network data processing system 100. Network 130 may include connections, such as wire, wireless communication links, or fiber optic cables.

In some embodiments, server 140 and server 150 connect to network 130 along with data store 160. Server 140 and server 150 may be, for example, IBM® Power Systems™ servers. In addition, clients 110 and 120 connect to network 130. Clients 110 and 120 may be, for example, personal computers or network computers. In the depicted example, server 140 provides data and/or services such as, but not limited to, data files, operating system images, and applications to clients 110 and 120. Network data processing system 100 may include additional servers, clients, and other devices.

In the depicted example, network data processing system 100 is the Internet with network 130 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

FIG. 2 is an embodiment of a data processing system 200 such as, but not limited to, client 110 and/or server 140 in which an embodiment of a system for mobility operation resource allocation according to the present disclosure may be implemented. In this embodiment, data processing system 200 includes a bus or communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

In some embodiments, memory 206 may be a random access memory or any other suitable volatile or non-volatile storage device. Persistent storage 208 may take various forms depending on the particular implementation. For example, persistent storage 208 may contain one or more components or devices. Persistent storage 208 may be a hard drive, a flash memory, a rewritable optical disk, a rewritable magnetic tape, or some combination of the above. The media used by persistent storage 208 also may be removable such as, but not limited to, a removable hard drive.

Communications unit 210 provides for communications with other data processing systems or devices. In these examples, communications unit 210 is a network interface card. Modems, cable modem and Ethernet cards are just a few of the currently available types of network interface adapters. Communications unit 210 may provide communications through the use of either or both physical and wireless communications links.

Input/output unit 212 enables input and output of data with other devices that may be connected to data processing system 200. In some embodiments, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. For example, a storage device in data processing system 200 is any hardware apparatus that may store data. Memory 206, persistent storage 208, and computer readable media 218 are examples of storage devices in a tangible form.

Figure 3:
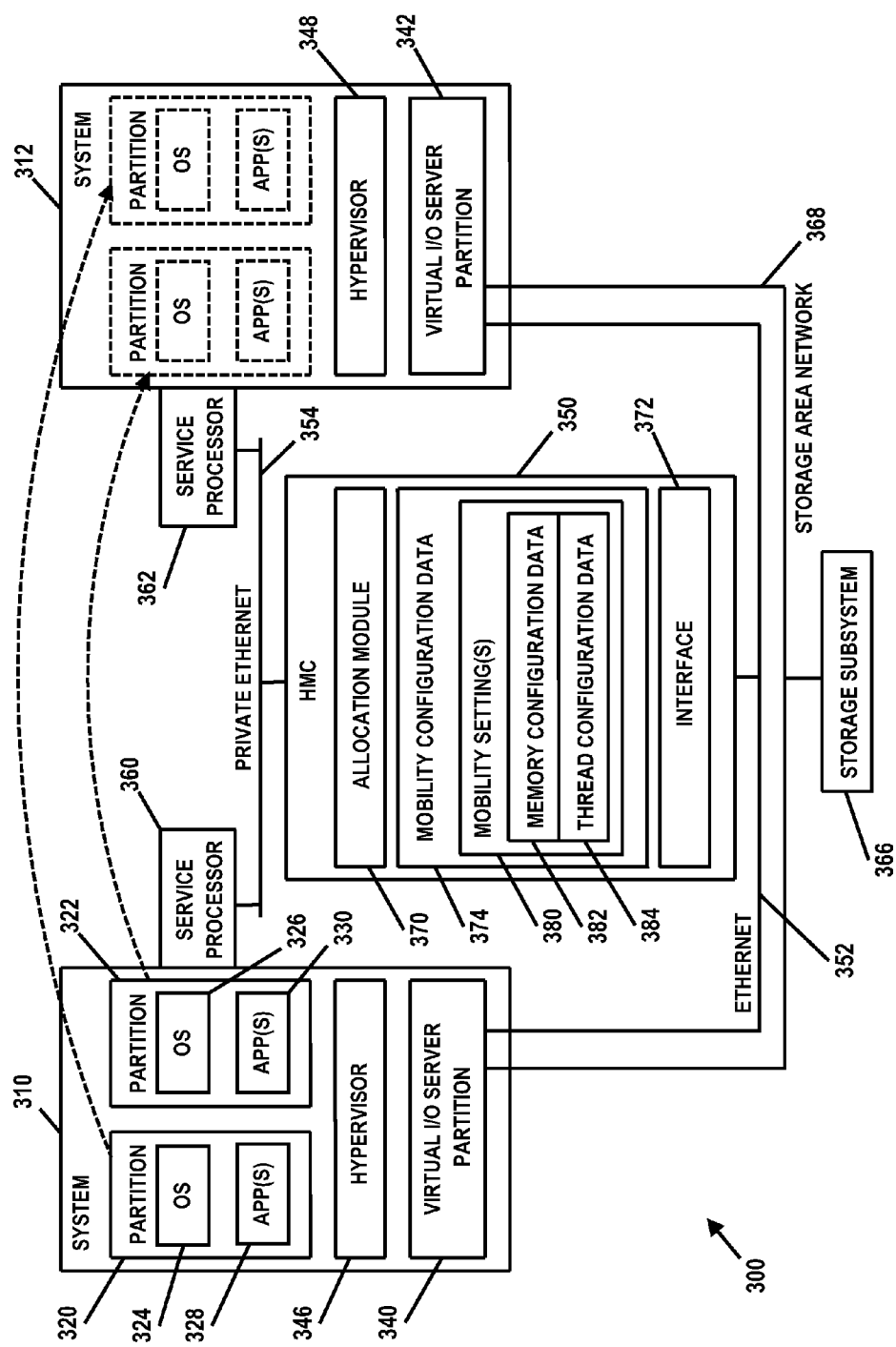
FIG. 3 is a diagram illustrating an embodiment of a data processing system for mobility operation resource allocation in which illustrative embodiments of the present disclosure may be implemented.

FIG. 3 is an illustrative embodiment of a system 300 for mobility operation resource allocation. System 300 may be implemented on data processing systems or platforms such as, but not limited to, servers 140 and/or 150, clients 110 and/or 120, or at other data processing system locations. In the embodiment illustrated in FIG. 3, system 300 includes a server system 310 and a server system 312. Processors, memory, and other hardware resources of computer system server systems 310 and 312 may be apportioned into logical partitions (LPARs) that may operate independently, each LPAR running its own operating system and applications. In the illustrated embodiment, server system 310 includes LPARs 320 and 322; however, it should be understood that a greater or fewer quantity of LPARs may be provisioned. LPARs are assigned a subset of a computer's physical hardware resources (i.e., a subset of the hardware underlying the server environment) and are virtualized within the server environment as a separate computer/virtual machine. Resources such as processor capacity, memory, or any other type of resource may be assigned to a particular LPAR. Each LPAR has its own virtual operating system (OS) instance (e.g., operating systems 334 and 326 in respective LPARs 320 and 322), application programs (e.g., application(s) 328 and 330 in respective LPARs 320 and 322) and/or associated files, allowing for multiple operating systems to be simultaneously executing within the server environment.

A LPAR 340 (in server system 310) and a LPAR 342 (in server system 312) is dedicated to implementing I/O functionality by executing virtual I/O server (VIOS) software/firmware (software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system)). The LPAR 340/342 running the VIOS software/firmware may be referred to herein as a VIOS LPAR or VIOS partition 340/342. Likewise, the executing VIOS software/firmware, which provides VIOS functionality, may be referred to herein as a VIOS. Logical partitioning is facilitated by software 346 and 348 in respective server systems 310 and 312 (a "hypervisor") that controls the computer system's hardware and monitors the operating systems of the LPARs. Hypervisor 346/348 operates at a level between the logical partition operating systems level and server system physical hardware. Hypervisor 346/348 may run directly on the computer system's hardware or within a conventional operating system environment, depending upon the implementation.

In the embodiment illustrated in FIG. 3, LPARs 320 and 322 are being migrated from server system 310 to server system 312. It should be understood that a single LPAR or multiple LPARs may be migrated between different hardware platforms. Further, multiple LPARs may be migrated serially or concurrently. The transfer or migration of LPARs from server system 310 to server system 312 is coordinated by a hardware management console (HMC) 350. HMC 350, or portions thereof, may be implemented in any suitable manner using known techniques that may be hardware-based, software-based, or some combination of both. For example, HMC 350 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system). The transfer of partitions may be performed over an Ethernet 352 (e.g., using iSCSI protocols) or a private Ethernet 354 through respective service processors 360 and 362. Server systems 310 and 312 may also be configured with access through respective VIOS partitions 340 and 342 to an external storage subsystem 366 via a storage area network (SAN) 368. Although the description provided herein may be directed toward the migration of an LPAR from server system 310 to server system 312, each of server systems 310 and 312 may be similarly configured to enable the functions described herein.

Live LPAR mobility enables a running LPAR(s) with its OS and applications to be transferred from one physical hardware platform to a different hardware platform. VIOS partitions 340 and 342 are configured with code and/or routines to provide the function of transporting the partition sate from one hardware platform to another hardware platform. A VIOS partition with mobility capability enabled may sometimes be referred to as a mover service partition (MSP). At least one virtual asynchronous services interface (VASI) device of the MSP enables the MSP to communicate with its respective hypervisor. Hypervisors 346/348 maintain information corresponding to a state of a partition, including the partition's memory. During migration, hypervisors 346 and 348 provide support to transfer partition information (e.g., state information and a memory image) between MSP partitions. Source and destination mover service partitions communicate with each other over the network. On both the source and destination server systems, the VASI device provides communication between the MSP and the hypervisor. To move a partition's memory image, the hypervisor sends and tracks the partition's memory pages relying on the source and destination MSPs to provide central processing unit (CPU) and memory resources. If the migrating partition writes to a memory page after its information has been sent to the destination MSP, the hypervisor manages re-sending the memory pages with the updated write content to enable the partition to continue to run during the mobility operation. Thus, data flows from the source hypervisor on the source server system through the source MSP to the destination MSP and down to the hypervisor on the source server system.

In some instances, a partition's memory page may be quite large (e.g., if running databases). Further, the amount of VIOS CPU cycles utilized by a hypervisor increases if the MSP needs to support mobility of large partitions or a relatively large number of concurrent partition mobility operations. Accordingly, the length of time and rate of data transfer for the mobility operations are bound by the amount of memory and CPU cycles provided to the hypervisors by the MSP.

Embodiments of the present disclosure enable the selection and/or configuration of resources to be used for partition mobility operations to accommodate and/or balance performance and concurrency. As indicated above, the length of time and rate of data transfer for the mobility operations is dependent on the amount of memory a hypervisor has access to for migrating a partition's memory and the number of CPU threads used for managing the memory buffers. The amount of memory depends on both the size and number of memory buffers allocated per mobility operation. Further, the amount of CPU used per mobility operation depends on the number of threads used and the length of time the threads run. Embodiments of the present disclosure enable the flexible selection of memory resources and CPU thread configuration (e.g., number and running time) in a way to fit concurrency versus performance needs for the partition mobility operations. For example, for partitions with relatively light memory usage, a larger number of concurrent operations may be performed at a reduced rate or a smaller quantity of concurrent operations at a higher rate of speed.

In the embodiment illustrated in FIG. 3, HMC 350 includes an allocation module 370, an interface 372 and mobility configuration data 374. Allocation module 370 is used to select and/or set a desired allocation of resources for partition mobility operations. The allocation settings may be applied to a particular mobility operation or a set of mobility operations. For example, the allocation setting may be selected to apply to each partition for a mobility operation covering multiple partitions. The allocation setting may also be selected to apply and/or vary for certain partitions (even though the mobility operation may cover multiple partitions). For example, in some embodiments, a mobility operation may be directed toward five different partitions ($LPAR_1$-$LPAR_5$). A particular allocation setting may be set/applied to $LPAR_1$, $LPAR_2$ and $LPAR_4$, while a different allocation setting may be set/applied to $LPAR_3$ and $LPAR_5$. The mobility operation may be initiated and the different allocation settings automatically applied on a partition-by-partition basis (e.g., applying one setting for one set of LPARs and a different setting to a different set of LPARs). Allocation module 370 may be implemented in any suitable manner using known techniques that may be hardware-based, software-based, or some combination of both. For example, allocation module 370 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system).

Mobility configuration data 374 may comprise information associated with the allocation of memory and/or CPU resources to apply to partition mobility operations. For example, in the illustrated embodiment, mobility configuration data 374 includes one or more mobility settings 380 comprising memory configuration data 382 and thread configuration data 384. A particular value and/or setting for memory configuration data 382 and thread configuration data 384 may correspond to a particular respective memory buffer and CPU thread configuration setting for a mobility operation. Memory configuration data 382 may correspond to a quantity and/or size of memory resources. Thread configuration data 384 may correspond to a quantity of CPU threads, a running time of threads and/or thread prioritization. It should be understood that other types of resources and/or resource attributes may be correspondingly set/allocated for the mobility operations to accommodate performance and/or concurrency requirements.

Interface 372 is used to provide a graphical user interface (GUI) or other type of interface to enable a user/administrator to select the resource allocation configuration settings to apply to the partition mobility operation. Interface 372 may be implemented in any suitable manner using known techniques that may be hardware-based, software-based, or some combination of both. For example, interface 372 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system).

In some embodiments, interface 372 may be configured to identify default values applied for memory configuration data 382 and thread configuration data 384 based on a particular setting 380 selected by a user/administrator. For example, in some embodiments, interface 372 may comprise a slider bar or other type of GUI such that a particular value/setting on the slider bar/GUI corresponds to particular memory configuration data 382 and/or thread configuration data 384 settings. In this embodiment, a lower slider bar/GUI value or setting may correspond to higher performance such that a greater quantity and/or larger size memory resources are allocated and/or provided to hypervisors. Also, additional threads may be used for managing the migration of memory information. With this setting, a large, active partition may be migrated faster because the hypervisor has access to more memory and thread resources for the mobility operation. Correspondingly, a higher slider bar/GUI value or setting may correspond to greater/maximum concurrency such that smaller sized memory resources are allocated to the hypervisor and perhaps one thread is used to manage memory resources. With this setting, many, less active partitions may be migrated concurrently because the hypervisor has access to less memory resources so more operations can be handled without impacting other VIOS operations. In some embodiments, interface 372 may be configured to enable a user/administrator to select particular memory and/or thread allocation settings for mobility operations, thereby enabling a customized resource allocation for mobility operations. Thus, in response to the selection of particular setting 380, allocation module 370 allocates corresponding memory and CPU resources utilized for the mobility operations. Further, in some embodiments, allocation module 370 may be used to prioritize the migration of LPARs. For example, in some embodiments, a user/administrator may desire that certain migration operations be prioritized for certain LPARs. Allocation module is configured to perform the mobility operations according to the set prioritization.

Figure 4:
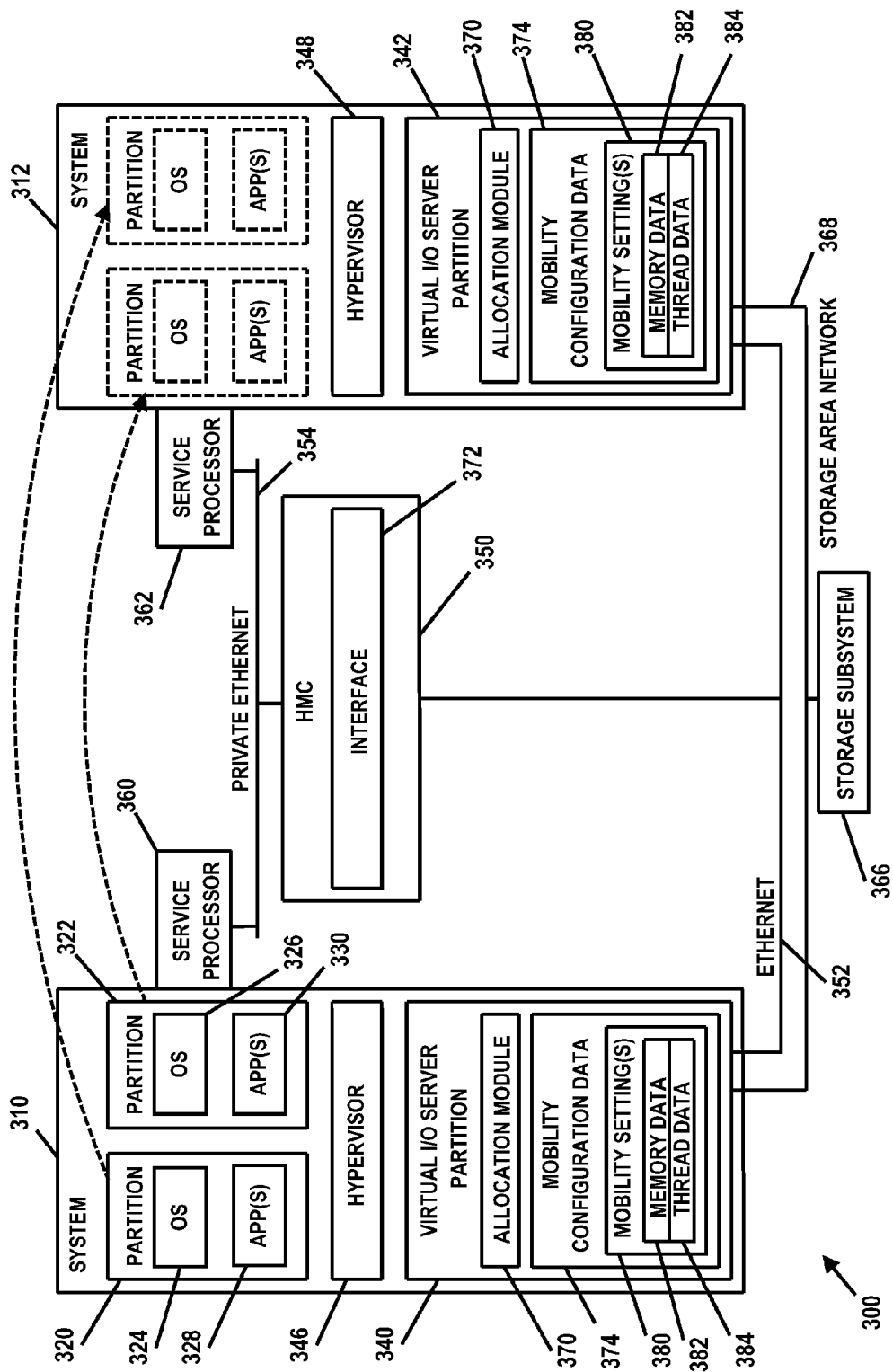
FIG. 4 is a diagram illustrating another embodiment of a data processing system for mobility operation resource allocation in which illustrative embodiments of the present disclosure may be implemented.

In FIG. 3, allocation module 370 and mobility configuration data 374 are depicted as part of HMC 350. FIG. 4 is an illustrative alternate embodiment of system 300 for mobility operation resource allocation. In FIG. 4, allocation module 370 and mobility configuration data 374, and corresponding functions thereof, are implemented within VIOS partitions 340 and 342. For example, in some embodiments, interface 372 of HMC 350 may be used to display various mobility settings 380 that may be available for partition migration. In response to receiving a selection of a mobility setting 380 and/or applicable LPARs, the selected setting 380 and/or applicable LPAR information may be communicated from HMC 350 to VIOS partition 340 and/or 342. In this embodiment, allocation module 370 (implemented as part of VIOS partition 340 and/or 342) identifies the resource requirements desired for the migration based on the selected setting 380 (e.g., using memory configuration data 382 and/or thread configuration data 384), determines the availability of such resources, and initiates the migration operation(s) based on the mobility setting(s) 380 and resources allocated.

Referring to FIGS. 3 and 4, in some embodiments, VIOS partition 340 and/or 342 is configured to negotiate the allocation of memory and/or CPU resources between the source MSP and the destination MSP. For example, in some instances, the resources available by the source MSP may be greater than the resources available on the destination MSP, or vice versa. In this example, there may be a mismatch between available resources between the source and destination MSPs such that the mobility setting 380 desired may be available from the perspective of one MSP but be unavailable from the other MSP (or neither). In this instance, VIOS partition 340 and/or 342 (e.g., via a respectively configured allocation module 370 implemented as part of VIOS partition 340 and/or 342) may be configured to detect the mismatch and/or unavailability of MSP resources and negotiate a balanced resource allocation for the mobility operations based on resource availability of the source and/or destination MSP. For example, even though a particular setting 380 may indicate a high memory resource allocation to dedicate to the mobility operation, VIOS partition 340 and/or 342 may override and/or automatically adjust (e.g., without user/administrator intervention) the resource allocation to accommodate the current availability of resources of the source/destination MSP in view of the desired mobility setting 380.

Figure 5:
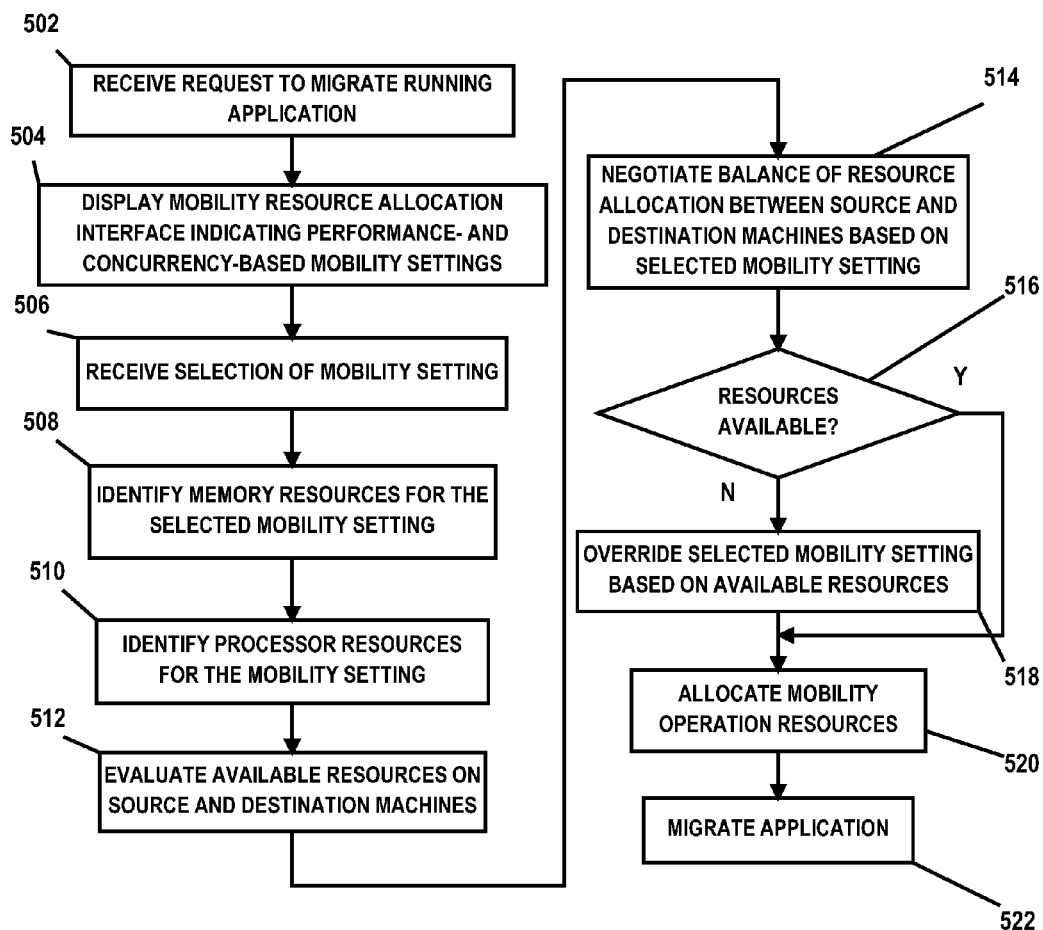
FIG. 5 is a flow diagram illustrating an embodiment of a method for mobility operation resource allocation according to the present disclosure.

FIG. 5 is a flow diagram illustrating an embodiment of a method for mobility operation resource allocation. The method begins at block 502, where HMC 350 receives a request to migrate one or more running applications or LPARs. At block 504, interface 372 is displayed indicating one or more performance-based and/or concurrency-based resource allocation settings to apply for the LPAR migration(s). At block 506, allocation module 370 receives one or more mobility settings 380 for the migration (e.g., a single setting to apply to all migrating LPARs and/or certain settings for certain LPARs). At block 508, allocation module 370 identifies the memory resource requirements according to the selected mobility setting(s). At block 510, allocation module 370 identifies processor resource requirements according to the selected mobility setting(s).

At block 512, VIOS partition 340 and/or 342 evaluates available resources on the source and/or destination MSPs based on the selected mobility setting(s). At block 514, VIOS partition 340 and/or 342 negotiates any needed balance of resource allocations between the source and destination MSPs (e.g., that may result from a mismatch of similar and/or available resources). At block 516, a determination is made whether resources are available based on the desired/selected mobility setting(s). If resources are available, the method proceeds to block 520. If it is determined at decisional block 516 that resources are unavailable based on the selected mobility setting(s), the method proceeds to block 518, where VIOS partition 340 and/or 342 overrides the selected mobility setting based on the available resources. At block 520, VIOS partition 340 and/or 342 allocates the resources for the migration. At block 522, the LPAR(s) are migrated utilizing the allocated resources.

Thus, embodiments of the present disclosure enable the flexible selection of resources to utilize for application migration based on performance and/or concurrency requirements. Embodiments of the present disclosure utilize an interface that enables a user/administrator to select performance-based and/or concurrency-based settings to utilize for application migration, thereby accommodating rapid movement of larger partitions when performance is critical and/or migrating a greater quantity of less active partitions concurrently if performance is not critical. Embodiments of the present disclosure enable a user/administrator to apply the mobility setting(s) on a partition-by-partition basis as well as prioritize the migration of certain partitions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system, comprising:
    a first machine having a running instance of an operating system and an application, the operating system and the application utilizing a first resource allocation to run on the first machine;
    a management console operable to manage migrating the running operating system and application from the first machine to a second machine, the management console further operable to:
        display an interface comprising a plurality of selectable mobility settings, each mobility setting corresponding to a second resource allocation to utilize for the migration;
        receive, via the interface, a selection of a mobility setting to apply for migrating the running operating system and application; and
        initiate migration of the running operating system and application from the first machine to the second machine utilizing the second resource allocation as set by the selected mobility setting.

2. The system of claim 1, further comprising at least one virtual input/output server (VIOS) partition operable to negotiate a balance of resource allocations between the first machine and the second machine based on the selected mobility setting.

3. The system of claim 2, wherein the VIOS partition is operable to automatically override the second resource allocation indicated by the selected mobility setting in response to identifying unavailable resources on either the first or second machines.

4. The system of claim 1, further comprising an allocation module operable to identify a memory resource allocation for the migration based on the selected mobility setting.

5. The system of claim 4, wherein the allocation module is operable to identify a processor resource allocation for the migration based on the selected mobility setting.

6. The system of claim 1, wherein the interface is configured to indicate a first mobility setting corresponding to a performance-based resource allocation and a second mobility setting corresponding to a concurrency-based resource allocation.

7. A computer program product for migration operation resource allocation, the computer program product comprising:
    a non-transitory computer readable medium having computer readable program code embodied therewith, the computer readable program code comprising computer readable program code configured to:
        receive a request to migrate a logical partition (LPAR) running an instance of an operating system and an application from a first machine to a second machine, the LPAR utilizing a first resource allocation on the first machine;
        display an adjustable resource allocation mobility setting interface indicating a plurality of mobility settings, each mobility setting corresponding to a second resource allocation to utilize for the migration;
        receive a selection of at least one mobility setting; and
        migrate the LPAR from the first machine to the second machine utilizing the second resource allocation as set by the selected mobility setting.

8. The computer program product of claim 7, wherein the computer readable program code is configured to negotiate a balance of resource allocations between the first machine and the second machine based on the selected mobility setting.

9. The computer program product of claim 8, wherein the computer readable program code is configured to automatically override the second resource allocation indicated by the selected mobility setting in response to identifying unavailable resources on either the first or second machines.

10. The computer program product of claim 7, wherein the computer readable program code is configured to identify a memory resource allocation for the migration based on the selected mobility setting.

11. The computer program product of claim 10, wherein the computer readable program code is configured to identify a processor resource allocation for the migration based on the selected mobility setting.

12. The computer program product of claim 7, wherein the computer readable program code is configured to display the interface to indicate a first mobility setting corresponding to a performance-based resource allocation and a second mobility setting corresponding to a concurrency-based resource allocation.

13. A system, comprising:
    a first machine having a plurality of logical partitions (LPARs) each running an instance of an operating system and an application; and
    a management console operable to manage migrating the plurality of LPARs from the first machine to a second machine, the management console further operable to:
        display an interface comprising a plurality of selectable mobility settings, each mobility setting corresponding to a desired resource allocation to utilize for the migration, wherein a first mobility setting sets a first resource allocation to accommodate a desired rate of migration, and wherein a second mobility setting sets a second resource allocation to accommodate a desired concurrency of LPAR migrations;

receive, via the interface, a selection of a mobility setting to apply for migrating the LPARs; and initiate migration of the LPARs from the first machine to the second machine utilizing resources as set by the selected mobility setting.

14. The system of claim 13, wherein each selectable mobility setting sets an amount of memory on the first and second machines to allocate to the migration and a quantity of threads to use on the first and second machines for the migration.

15. The system of claim 14, further comprising an allocation module configured to, in response to detecting a mismatch between the amount of memory on the first machine and the amount of memory on the second machine to allocate to the migration based on the selected mobility setting, negotiate a balance of resource allocation on the first and second machines based on available resources on the first and second machines.

16. The system of claim 13, wherein the management console is operable to receive a different selected mobility setting for each of the plurality of LPARs and automatically apply the respective selected mobility settings to the respective migrations of the LPARs.

17. The system of claim 14, wherein each selectable mobility setting sets a run time for the threads.

18. The system of claim 14, further comprising an allocation module configured to evaluate available resources on the first and second machines based on the selected mobility setting.

19. The system of claim 1, wherein:

each selectable mobility setting sets an amount of memory on the first and second machines to allocate to the migration and a quantity of threads to use on the first and second machines for the migration; and further comprising an allocation module configured to determine availability of the amount of memory and the quantity of threads on the first and second machines for the migration based on the selected mobility setting and, in response to determining an unavailability of the amount of memory or the quantity of threads on either the first or second machines for the migration, negotiate a balance of memory and threads to use on the first and second machines to use for the migration.

* * * * *